(12) United States Patent
Kobayashi et al.

(10) Patent No.: US 10,247,558 B2
(45) Date of Patent: Apr. 2, 2019

(54) TRAVEL DIRECTION DETERMINATION APPARATUS, MAP MATCHING APPARATUS, TRAVEL DIRECTION DETERMINATION METHOD, AND COMPUTER READABLE MEDIUM

(71) Applicant: Asahi Kasei Kabushiki Kaisha, Tokyo (JP)

(72) Inventors: Shiro Kobayashi, Tokyo (JP); Masahiro Konda, Tokyo (JP); Yuko Akagi, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 300 days.

(21) Appl. No.: 15/201,724

(22) Filed: Jul. 5, 2016

(65) Prior Publication Data

US 2016/0313128 A1 Oct. 27, 2016

Related U.S. Application Data

(63) Continuation of application No. PCT/JP2014/084401, filed on Dec. 25, 2014.

(30) Foreign Application Priority Data

Jan. 7, 2014 (JP) ................. 2014-001106

(51) Int. Cl.
*G01C 21/30* (2006.01)
*G01P 13/02* (2006.01)

(52) U.S. Cl.
CPC .............. *G01C 21/30* (2013.01); *G01P 13/02* (2013.01)

(58) Field of Classification Search
None
See application file for complete search history.

(56) References Cited

U.S. PATENT DOCUMENTS 7,805,275 B2 * 9/2010 Kitamura .............. A61B 5/1112
377/24.2
2002/0089425 A1 * 7/2002 Kubo ................... G01C 22/006
340/573.1

(Continued)

FOREIGN PATENT DOCUMENTS

EP 1867951 A1 * 12/2007 .......... A61B 5/1112
JP 4515497 B2 5/2010

(Continued)

OTHER PUBLICATIONS

International Search Report dated Jan. 27, 2015, for International Patent Application No. PCT/JP2014/084401.

(Continued)

*Primary Examiner* — Shelley Chen
(74) *Attorney, Agent, or Firm* — Morgan, Lewis & Bockius LLP (57) ABSTRACT

A travel direction determination apparatus is provided, including: a sensor signal acquisition unit that acquires sensor signals from sensors mounted in a mobile device; a first travel direction calculation unit that calculates a travel direction of the user without relying on a walking state of the user; a second travel direction calculation unit that calculates the travel direction of the user based on the sensor signals when the user who holds the mobile device is in a walking state; and a determination unit that determines the travel direction of the user first to the travel direction calculated by the first travel direction calculation unit, and then to the travel direction calculated by the second travel direction calculation unit, responding to changes in the state of the user from non-walking state to walking state.

13 Claims, 6 Drawing Sheets

(56) References Cited

U.S. PATENT DOCUMENTS

| | | | | |
|---|---|---|---|---|
| 2003/0139150 | A1* | 7/2003 | Rodriguez | G01C 21/20 455/90.1 |
| 2004/0206164 | A1* | 10/2004 | Kawai | B62D 57/032 73/65.07 |
| 2007/0150229 | A1* | 6/2007 | Fujiwara | G01C 22/006 702/160 |
| 2011/0060709 | A1* | 3/2011 | Ide | G01C 21/3484 706/12 |
| 2011/0302116 | A1* | 12/2011 | Ide | G01C 21/3484 706/12 |
| 2013/0204572 | A1* | 8/2013 | Sato | G01C 21/16 702/141 |
| 2013/0311134 | A1* | 11/2013 | Kordari | G01C 22/006 702/160 |
| 2014/0070790 | A1* | 3/2014 | Fujiwara | G01R 21/00 324/76.11 |
| 2014/0142885 | A1* | 5/2014 | Chowdhary | G01C 21/12 702/141 |
| 2014/0309963 | A1* | 10/2014 | Tsukamoto | G01C 21/12 702/150 |
| 2015/0042451 | A1* | 2/2015 | Matsumoto | G01C 21/165 340/5.61 |
| 2015/0281910 | A1* | 10/2015 | Choudhury | G01S 5/021 455/456.1 |
| 2015/0365806 | A1* | 12/2015 | Parviainen | G06F 3/0346 455/457 |

FOREIGN PATENT DOCUMENTS

| | | |
|---|---|---|
| JP | 2012-145457 A | 8/2012 |
| JP | 5334131 B2 * | 11/2013 |

OTHER PUBLICATIONS

International Preliminary Report on Patentability dated Jul. 21, 2016 for International Application No. PCT/JP2014/084401.

* cited by examiner

TRAVEL DIRECTION DETERMINATION APPARATUS, MAP MATCHING APPARATUS, TRAVEL DIRECTION DETERMINATION METHOD, AND COMPUTER READABLE MEDIUM

The contents of the following Japanese and PCT patent applications are incorporated herein by reference:
No. 2014-001106 filed on Jan. 7, 2014, and
No. PCT/JP2014/084401 filed on Dec. 25, 2014

BACKGROUND

1. Technical Field

The present invention relates to a travel direction determination apparatus, a map matching apparatus, a travel direction determination method, and a computer readable medium.

2. Related Art

An estimation method or the like, that estimates a travel direction of a user who holds a mobile device or the like responding to an output of sensors or the like mounted in the mobile device, has been conventionally known (refer to, for example, Patent Document 1).

PRIOR ART DOCUMENT

Patent Document 1: Japanese Patent Application Publication No. 2012-145457

In such an estimation method, sensor signals of when a user performed walking movement have been analyzed, and a travel direction of the user has been estimated from periodic signals that accompany the walking movement. However, when the user starts the walking movement from a state in which the user stands still, the walking movement of the user becomes unstable, and thus, the periodic signals that accompany walking of the user also become unstable. Thereby, there were cases where estimation accuracy of the travel direction decreased compared to stable walking movement of the user.

SUMMARY

Therefore, it is an object of an aspect of the innovations herein to provide a travel direction determination apparatus, a map matching apparatus, a travel direction determination method, and a computer readable medium which are capable of overcoming the above drawbacks accompanying the related art. The above and other objects can be achieved by combinations described in the claims. A first aspect of the innovations may include a travel direction determination apparatus, a travel direction determination method, and a computer readable medium, the travel direction determination apparatus including a sensor signal acquisition unit that acquires sensor signals from sensors mounted in a mobile device, a first travel direction calculation unit that calculates a travel direction of a user without relying on a walking state of the user, a second travel direction calculation unit that calculates the travel direction of the user based on the sensor signals when the user who holds the mobile device is in a walking state, and a determination unit that first determines the travel direction calculated by the first travel direction calculation unit as the travel direction of the user, and then determines the travel direction calculated by the second travel direction calculation unit as the travel direction of the user, responding to changes in the state of the user from non-walking state to walking state.

A second aspect of the innovations may include a map matching apparatus, the map matching apparatus including the travel direction determination apparatus, a storage unit that stores an initial position of the user and map information, and a position decision unit that decides a position of the user on a map based on a movement amount from the initial position according to travel direction information of the user which is output from the travel direction output apparatus.

The summary clause does not necessarily describe all necessary features of the embodiments of the present invention. The present invention may also be a sub-combination of the features described above.

DESCRIPTION OF EXEMPLARY EMBODIMENTS

The embodiments do not limit the invention according to the claims, and all the combinations of the features described in the embodiments are not necessarily essential to means provided by aspects of the invention.

Figure 1:
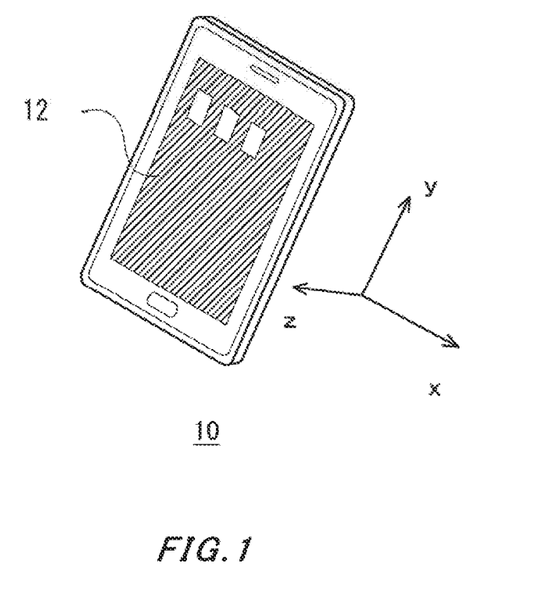
FIG. 1 shows an example of a mobile device 10 according to an embodiment of the present invention.

FIG. 1 shows an example of a mobile device 10 according to an embodiment of the present invention. The mobile device 10 has a plurality of sensors mounted therein, which detect the movement, holding style, and position, and the like of the mobile device 10. The mobile device 10 is provided with an autonomous navigation system which displays a current position of the mobile device 10, and a route from the current position to a destination, and the like responding to an output of the sensors or the like mounted in the mobile device 10 itself. In addition, the mobile device 10 is further provided with a map matching function, and may function as a map matching apparatus.

The mobile device 10 is provided with a communication function for connecting to an external apparatus, and the Internet, and the like, and a data processing function or the like for executing a program, as an example. The mobile device 10 is a smartphone, a mobile phone, a tablet PC (Personal Computer), a mobile GPS (Global Positioning System) device, or a miniature PC, or the like, for example. The mobile device 10 is provided with a display unit 12.

The display unit 12 displays a screen for manipulating Internet web pages, electronic mails, maps, or documents, audio, videos and image data, or the like, according to instructions from a user, for example. Also, the display unit 12 is a touch panel display into which the user instructions are input, and the user instructions are input to a manipulation screen of software such as a browser by touch input from the user, for example. Alternatively, the user instructions may be input to the mobile device 10 through gesture input. Alternatively, the user instructions may be input to the mobile device 10 through an input device such as a keyboard, a mouse, and/or a joystick.

Here, an example of the mobile device 10 according to the present embodiment is described, in which a surface parallel to a display surface of the display unit 12 is being an xy-plane, and a direction vertical to this display surface is being a z-axis. Also, an example of the mobile device 10 according to the present embodiment is described, in which the display unit 12 has a vertically long rectangular shape. Moreover, among two pairs of sides facing each other in the rectangle, a direction along a shorter side (transverse direction) is being an x-axis, and a direction along a longer side (longitudinal direction) is being a y-axis.

That is, an example is described, in which, when the user watches the display unit 12 while holding the mobile device 10 in hand, a horizontal direction is substantially parallel to the x-axis, and a vertical direction in which the user is standing (that is, gravity direction) is substantially parallel to a yz-plane. In this case, when the user uses the mobile device 10 as a telephone and places the mobile device 10 by the user's ear to converse, a travel direction in which the user is facing is substantially parallel to the xy-plane, and a surface vertical to the travel direction is substantially parallel to the z-axis.

Such a mobile device 10 of the present embodiment displays, on the display unit 12, positional information of the user who holds the mobile device 10, using a plurality of positioning methods and systems. When signals from a plurality of GPS satellites can be received, for example, the mobile device 10 displays the positional information of the user using GPS function. Also, when signals from a plurality of GPS satellites cannot be received, the mobile device 10 may continue to display the estimation of the positional information of the user by switching from the GPS to the autonomous navigation system and using the positional information acquired from the GPS as an initial position of the user.

Alternatively, the mobile device 10 may start the autonomous navigation system responding to an input of the user. In this case, the mobile device 10 may also acquire information of the initial position of the user by the input of the user. Also, the mobile device 10 may display the positional information of the user together with map information by executing map matching.

When the user uses such an autonomous navigation, the mobile device 10 calculates the current position, the travel direction, and the movement route of the user, and the like by the autonomous navigation system based on information of the travel direction of the user, and shows them to the user. Here, the mobile device 10 calculates the information of the travel direction of the user based on the sensor signals output by the sensors mounted in the mobile device 10 being held by the user. More specifically, the mobile device 10 calculates the travel direction of the user by analyzing signal components according to the walking movement of the user included in the sensor signals.

Therefore, when the user starts the walking movement from a non-walking state in which the user stands still, periodic signals or the like that accompany the walking cannot be detected, and thus the travel direction of the user cannot be estimated. Also, there were cases in which the walking movement of the user did not become stable immediately after the user started the walking movement, and a posture fluctuation of the mobile device or the like is caused, thereby decreasing the estimation accuracy of the travel direction compared to the stable walking movement. Therefore, the mobile device 10 of the present embodiment is provided with the travel direction determination apparatus that calculates the travel direction of the user without relying on the walking state of the user, and precisely estimates the travel direction of the user regardless of whether or not the user stands still or is walking.

Figure 2:
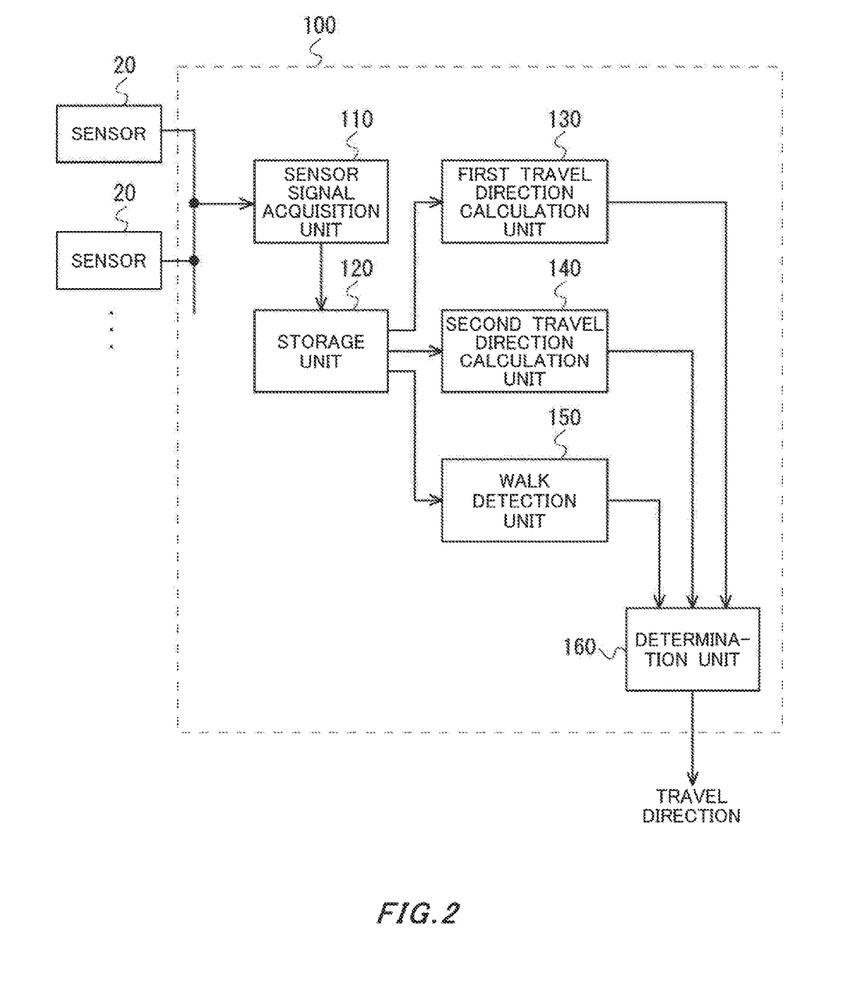
FIG. 2 shows an exemplary configuration of a travel direction determination apparatus 100 together with sensors 20 according to the present embodiment.

FIG. 2 shows an exemplary configuration of the travel direction determination apparatus 100 together with sensors 20 according to the present embodiment. Each sensor 20 may include at least one of angular velocity sensors, accelerometers, and geomagnetic sensors mounted in the mobile device 10, and may also be a combination thereof. Each sensor 20 outputs a detection result of acceleration, angular velocity, and/or geomagnetism relative to at least two axes of three xyz-axes (x-axis, y-axis, and z-axis) of an orthogonal coordinate system with its origin at the mobile device having the sensors 20 mounted thereon, for example.

The travel direction determination apparatus 100 determines the travel direction of the user who holds the mobile device 10. The travel direction determination apparatus 100 is provided with a sensor signal acquisition unit 110, a storage unit 120, a first travel direction calculation unit 130, a second travel direction calculation unit 140, a walk detection unit 150, and a determination unit 160.

The sensor signal acquisition unit 110 is connected to a plurality of sensors 20, and acquires sensor signals of the sensors 20 mounted in the mobile device 10. The sensor signal acquisition unit 110 acquires the sensor signals from the sensors 20 according to a moving state of the user such as movement and stillness of the mobile device 10. In the present embodiment, an example of the sensor signal acquisition unit 110 is described in which the sensor signals of at least either one of the angular velocity sensors and the accelerometers mounted in the mobile device 10 are acquired. The sensor signal acquisition unit 110 stores the acquired sensor signals in the storage unit 120.

The storage unit 120 is connected to the sensor signal acquisition unit 110, and stores the sensor signals received from the sensor signal acquisition unit 110. The storage unit 120 provides requesters, such as the first travel direction calculation unit 130, the walk detection unit 150, and the second travel direction calculation unit 140, upon request from each unit with information of the stored sensor signals, for example.

The first travel direction calculation unit 130 calculates the travel direction of the user without relying on the walking state of the user. The first travel direction calculation unit 130 is connected to the storage unit 120, and calculates the travel direction of the user responding to changes in the orientation of the mobile device 10 based on the sensor signals stored in the storage unit 120. The first travel direction calculation unit 130 provides the determination unit 160 with the calculated travel direction of the user as a first travel direction.

The second travel direction calculation unit 140 is connected to the storage unit 120, and calculates the travel direction of the user based on the sensor signals stored in the storage unit 120. Here, the second travel direction calculation unit 140 calculates the travel direction of the user when the user who holds the mobile device 10 is in the walking state. Here, when the user is in the non-walking state, the second travel direction calculation unit 140 includes errors in the travel direction of the user to be calculated. The second travel direction calculation unit 140 provides the determination unit 160 with the calculated travel direction of the user as a second travel direction.

The walk detection unit 150 is connected to the storage unit 120, and detects whether or not the user is in the walking state based on the sensor signals stored in the storage unit 120. The walk detection unit 150 is connected to the second travel direction calculation unit 140, and provides the determination unit 160 with a detected result.

The determination unit 160 is connected to each of the first travel direction calculation unit 130, the second travel direction calculation unit 140, and the walk detection unit 150, and determines either one of the first travel direction and the second travel direction as the travel direction of the user according to the walking state of the user detected by the walk detection unit 150.

The determination unit 160 determines the first travel direction calculated by the first travel direction calculation unit 130 as the travel direction of the user, when the state of the user state is the non-walking state. Also, the determination unit 160 determines the travel direction calculated by the first travel direction calculation unit 130 as the travel direction of the user, and then determines the travel direction calculated by the second travel direction calculation unit 140 as the travel direction of the user, responding to the changes in the state of the user from the non-walking state to the walking state.

For example, the determination unit 160 determines, as the travel direction of the user, the second travel direction calculated by the second travel direction calculation unit 140 after a predetermined period has elapsed since the state of the user changed from the non-walking state to the walking state. Also, the determination unit 160 may determine the travel direction of the user from an output of the first travel direction calculation unit 130 until it is detected that the user took a predetermined number of steps since the state of the user has changed from the non-walking state to the walking state, and may determine the travel direction of the user from the output of the second travel direction calculation unit 140 after the predetermined number of steps was detected. The determination unit 160 outputs a determined travel direction of the user as a determination result of the travel direction determination apparatus 100.

The travel direction determination apparatus 100 of the present embodiment described above is provided with the first travel direction calculation unit 130 capable of calculating the travel direction without relying on the walking state of the user and the second travel direction calculation unit 140 that calculates the travel direction relying on the walking state of the user. The travel direction determination apparatus 100 of the present embodiment described above precisely estimates the travel direction of the user by switching methods of calculating the travel direction according to the walking state of the user. That is, the travel direction determination apparatus 100 can enhance, by the first travel direction calculation unit 130, the estimation accuracy of the travel direction of when the user starts the walking movement from the state in which the user stands still. Moreover, by switching the methods of calculating the travel direction according to the walking state of the user, the travel direction determination apparatus 100 can both enhance the travel direction estimation accuracy of when the user started to walk and enhance the travel direction estimation accuracy of when the user is walking stably. An operation of the travel direction determination apparatus 100 will be described in FIG. 3.

Figure 3:
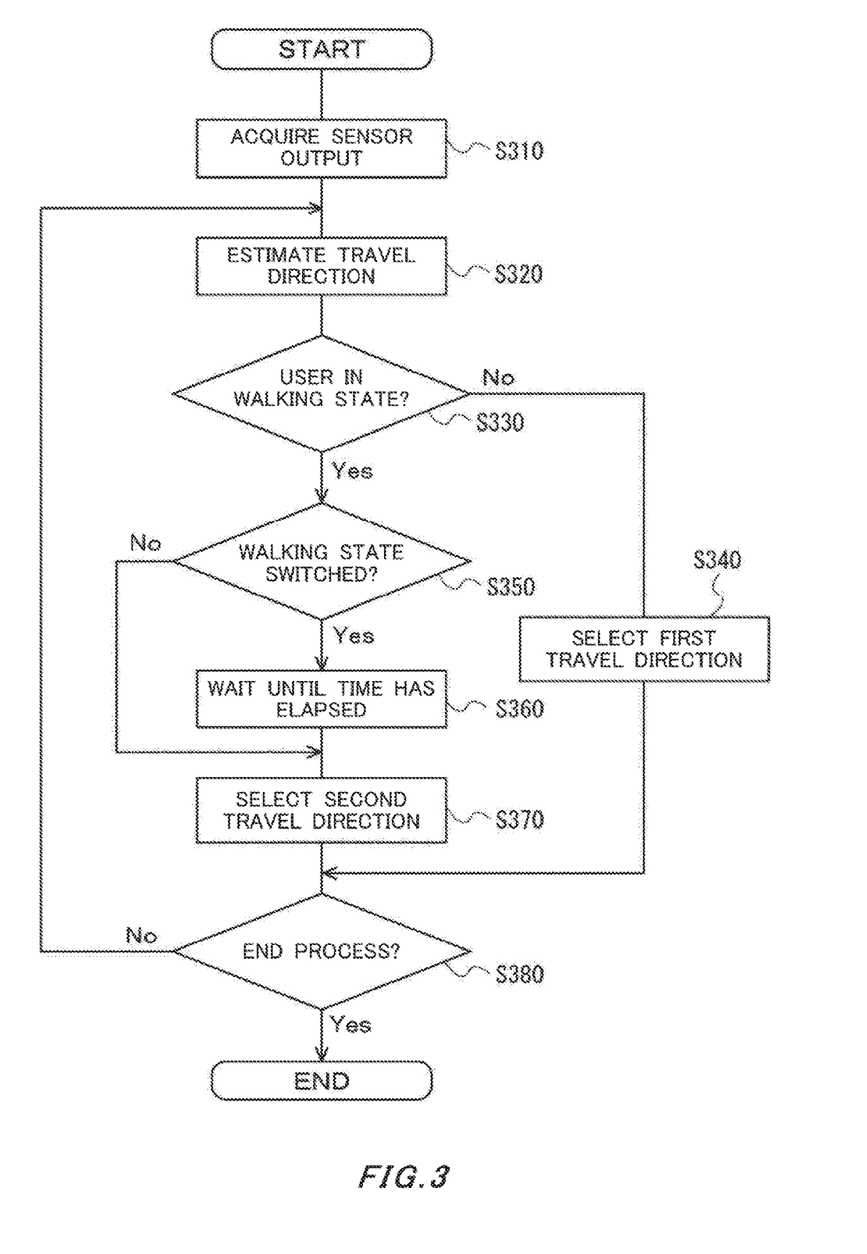
FIG. 3 shows an operational flow of the travel direction determination apparatus 100 according to the present embodiment.

FIG. 3 shows an operational flow of the travel direction determination apparatus 100 according to the present embodiment. The travel direction determination apparatus 100 estimates the travel direction of the user who carries the mobile device 10 by executing the operational flow shown in FIG. 3.

First, the sensor signal acquisition unit 110 acquires the output from a plurality of the sensors 20 connected to the travel direction determination apparatus 100 (S310). The sensor signal acquisition unit 110 stores the acquired sensor signals in the storage unit 120. The sensor signal acquisition unit 110 may continue to execute acquisition of the sensor signals and storage of the sensor signals in the storage unit 120 in synchronization with an output timing of the sensor signals of the sensors 20. Alternatively, the sensor signal acquisition unit 110 may also continue to execute the acquisition of the sensor signals and the storage of the sensor signals in the storage unit 120 at a predetermined period.

Next, the first travel direction calculation unit 130 and the second travel direction calculation unit 140 calculate the travel direction of the user based on the sensor signals (S320). The first travel direction calculation unit 130 and the second travel direction calculation unit 140 accumulate the changes in the travel direction of the user from an initial value, and estimate the travel direction of the user, as an example.

The first travel direction calculation unit 130 calculates from the sensor signals rotation angles about a gravity axis of the mobile device 10, and calculates the travel direction of the user from a cumulative value of the calculation results of rotation angle. Also, the first travel direction calculation unit 130 calculates the rotation angle about the gravity axis of the mobile device 10 based on the sensor signals of the sensors 20 that detect the rotation angles of two or more axial directions of the mobile device 10. Here, an operation in which the first travel direction calculation unit 130 calculates the travel direction of the user will be described using FIG. 4.

Figure 4:
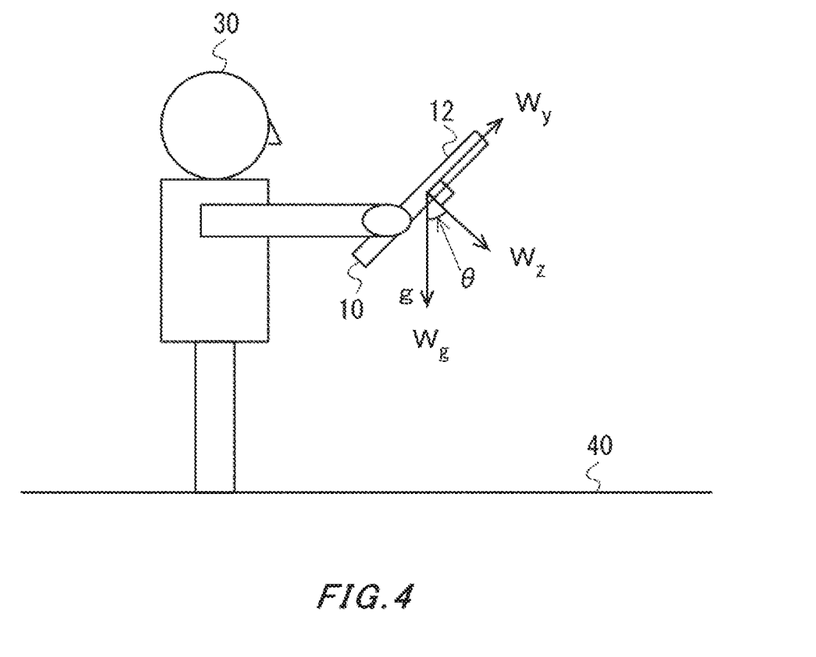
FIG. 4 shows an example of a user 30 who holds the mobile device 10 according to the present embodiment.

FIG. 4 shows an example of the user 30 who holds the mobile device 10 according to the present embodiment. FIG. 4 shows an example in which the user 30 who holds the mobile device 10 stands still on the horizontal ground 40 or is walking on the horizontal ground 40. FIG. 4 shows an example in which the gravity direction is shown as g, and the mobile device 10 forms angles of θ degree, θ+90 degrees, and 90 degrees with the z-axis, the y-axis, and the x-axis, respectively, relative to the gravity direction g.

The first travel direction calculation unit 130 calculates the angles formed between each axis of the mobile device 10 and the gravity direction g based on the sensor signals of a plurality of the accelerometers, as an example. Here, gravitational acceleration is known as 1 G and thus it is possible to calculate the angles formed between each axis of the mobile device 10 and the gravity direction g from a degree of the 1 G acting on the xyz-axes of the mobile device 10. That is, the first travel direction calculation unit 130 can calculate the angle creations of θ degree, θ+90 degrees, and 90 degrees with the z-axis, the y-axis, and the x-axis of the mobile device 10, respectively, relative to the gravity direction g.

Moreover, the first travel direction calculation unit 130 calculates a rotation amount $W_g$ about the gravity axis from the sensor signals of the angular velocity sensors corresponding to each axis of the xyz-axes of the mobile device 10. In the case of the example of FIG. 4, the first travel direction calculation unit 130 can calculate the rotation amount $W_g$ about the gravity axis according to a rotation amount $W_y$ about the y-axis and a rotation amount $W_z$ about the z-axis which are obtained from the sensor signals, as shown in the following expression.

$$W_g = W_y \sin\theta + W_z \cos\theta \qquad \text{Expression 1}$$

Also, the first travel direction calculation unit 130 may select two sensor signals having the largest and the second largest absolute values of signal component about the gravity axis out of the sensor signals of the sensors 20 that detect the rotation angles of three axial directions of the mobile device 10. The first travel direction calculation unit 130 may then calculate the rotation angle about the gravity axis of the mobile device 10 based on the selected two sensor signals. Here, when the user 30 holds the mobile device 10, one axis of the xyz-axes is often relatively directed toward the vertical direction relative to the gravity direction g.

For example, as shown in FIG. 4, when the user 30 watches the display unit 12 of the mobile device 10, an x-axis direction is directed toward the substantially vertical direction relative to the gravity direction g. Also, when the user 30 watches the display unit 12 while holding the mobile device 10 in a transverse direction, a y-axis direction is directed toward the substantially vertical direction relative to the gravity direction g. Also, when the user 30 places the mobile device 10 by the user's ear to converse, the x-axis direction and the y-axis direction are directed toward the substantially vertical direction relative to the gravity direction g.

In this way, if the user 30 holds the mobile device 10, at least one axis of the xyz-axes is directed toward the substantially vertical direction relative to the gravity direction g, and thus the sensor signals of the angular velocity sensors corresponding to the axis directed toward the vertical direction will contain almost no components calculated as the rotation amount $W_g$ about the gravity axis. For example, a rotation amount $W_x$ about the x-axis of FIG. 4 is not included in Expression 1.

Therefore, the first travel direction calculation unit 130 may select two rotation amounts $W_{max}$ having the largest component of the gravity direction and $W_{2nd}$ having the second largest component of the gravity direction, out of the sensor signals (rotation amounts) from three angular velocity sensors respectively corresponding to the xyz-axes, and then may calculate the rotation amount $W_g$ about the gravity axis using the selected rotation amounts $W_{max}$ and $W_{2nd}$. In this case, the first travel direction calculation unit 130 calculates the rotation amount $W_g$ about the gravity axis from the following expression.

$$W_g = W_{max} \sin\theta + W_{2nd} \cos\theta \qquad \text{Expression 2}$$

The first travel direction calculation unit 130 may calculate the rotation amount $W_g$ about the gravity axis from the components of two rotation amounts as described above, if the components of the gravity direction of the rotation amounts of three angular velocity sensors respectively corresponding to the xyz-axes are different to such an extent that the order can be determined. The first travel direction calculation unit 130 calculates the rotation amount $W_g$ about the gravity axis using Expression 2 when the smallest absolute value of the component of the gravity direction of the output value of three angular velocity sensors is smaller than a predetermined value, as an example.

Thereby, the first travel direction calculation unit 130 can calculate the rotation amount $W_g$ more easily and faster, compared to a case in which the first travel direction calculation unit 130 calculates the rotation amount $W_g$ about the gravity axis from the rotation amounts of three angular velocity sensors respectively corresponding to the xyz-axes.

The first travel direction calculation unit 130 calculates the travel direction of the user by integrating the rotation amounts $W_g$ about the gravity axis thus calculated.

Here, an example is described in which the rotation amount of the present embodiment has a sign according to the rotation direction, and an integration amount is calculated to be zero when being rotated to the same angle in different directions. That is, by integrating the calculated rotation amounts $W_g$ about the gravity axis into an initial angle in the gravity axis corresponding to the direction in which the user is facing in an initial state, the first travel direction calculation unit 130 calculates the direction in which the user is facing after an integrated time has elapsed.

For example, it is assumed that the user who holds the mobile device 10 changed the direction that faces about the gravity axis by 40 degrees in a clockwise direction of the gravity axis direction and by 75 degrees in a counterclockwise direction of the gravity axis direction together with the mobile device 10 within a predetermined time interval. In this case, the first travel direction calculation unit 130 takes 35 degrees in which each rotation amount is integrated as an angle at which the user changed the orientation from the initial angle. That is, the first travel direction calculation unit 130 outputs 35 degrees counterclockwise from the initial angle as the travel direction of the user. Here, the counterclockwise rotation direction has been described as a plus direction.

As described above, the first travel direction calculation unit 130 calculates from the sensor signals the rotation angles about the gravity axis of the mobile device 10, and can estimate the travel direction of the user from the cumulative value of the calculation results of rotation angle. Here, it is understood that the first travel direction calculation unit 130 can estimate the travel direction of the user regardless of whether or not the user is walking.

Meanwhile, the second travel direction calculation unit 140 performs a signal analysis or pattern matching or the like on the sensor signals to detect pattern signals that accompany the walking of the user, and then estimates the travel direction of the user by analyzing travel direction dependency of the pattern signals, for example. Such a method of estimating the travel direction of the user based on the sensor signals of when the user is walking has already been known in the autonomous navigation. The second travel direction calculation unit 140 may estimate the travel direction of the user by the already-known travel direction estimation method used as the autonomous navigation as set forth in, for example, Patent Document 1.

Next, the walk detection unit 150 detects whether or not the user is in the walking state (S330). The walk detection unit 150 detects whether or not the user is in the walking state based on a distribution value of a synthesis acceleration of a plurality of the accelerometers mounted in the mobile device 10, for example. The walk detection unit 150 calculates synthesis acceleration $v = (v_x^2 + v_y^2 + v_z^2)^{1/2}$ for outputs $v_x$, $v_y$, and $v_z$ of the accelerometers respectively corresponding to the xyz-axes, and then calculates distribution of the synthesis acceleration v, as an example.

Accordingly, gravitational acceleration 1 G is constantly added to the mobile device 10, and thus periodic acceleration added to the mobile device 10 will show acceleration 1 G-centered distribution properties. In particular, the acceleration substantially constant relative to the travel direction and the gravity direction which is vertical to the travel direction is added to the mobile device 10 by the walking of the user, and thus the walk detection unit 150 can detect whether or not the user is in the walking state from the distribution properties.

Also, the walk detection unit 150 may detect whether or not the user is walking depending on whether or not the output signals from each of the accelerometers vary at a period within a predetermined range. When the user is walking at substantially the same speed, the acceleration in the travel direction of the user and the direction vertical to the travel direction is generated at a substantially constant period. In this case, the acceleration for period and amplitude according to height, weight, length of foot, way of walking, and walking speed and the like of the user is generated, and the corresponding accelerometers output vibration patterns according to the walking of the user by detecting the acceleration, for example.

The walk detection unit 150 detects whether or not the user is walking according to pattern features of the sensor signals, as an example. In this case, the storage unit 120 may store the pattern signals that accompany the walking of the user in advance, and the walk detection unit 150 may detect the walking movement of the user by comparing the pattern features read from the storage unit 120 with the pattern features of the sensor signals. The walk detection unit 150 provides a detection result to the determination unit 160.

When the state of the user is the non-walking state (S330: No), the determination unit 160 determines the first travel direction calculated by the first travel direction calculation unit 130 as the travel direction of the user (S340). Thereby, when the periodic signals according to the walking such as a still state of the user and a state moving from the still state to the walking movement cannot be obtained, the travel direction determination apparatus 100 can decrease estimation errors with the use of the estimation result of the first travel direction calculation unit 130 using algorithm that does not rely on the walking state.

Also, when the state of the user is the walking state (S330: Yes), the determination unit 160 judges whether or not the walking state is a state switched from the non-walking state (S350). The determination unit 160 judges switchover of the walking state based on past results and current results determined by the walk detection unit 150, for example. Specifically, the determination unit 160 judges that the walking state has been continuing when a result before the current result of the walk detection unit 150 showed the walking state and the current result of the walk detection unit 150 also shows the walking state. Also, the determination unit 160 may judge that the state has changed from the non-walking state to the walking state when the previous result of the walk detection unit 150 showed the non-walking state while the current result of the walk detection unit 150 shows the walking movement.

When the determination unit 160 judges that the state has changed from the non-walking state to the walking state (S350: Yes), the determination unit 160 suspends a new determination process of the travel direction until a predetermined time has elapsed (S360). Alternatively, even if the new determination process of the travel direction is executed, the determination unit 160 does not output a determination result until the predetermined time has elapsed (S360).

Moreover, the determination unit 160 may determine the first travel direction calculated by the first travel direction calculation unit 130 as the travel direction of the user until the predetermined time has elapsed. Alternatively, the determination unit 160 may also determine the travel direction immediately before switchover of the state from the non-walking state to the walking state as the travel direction of the user. That is, the determination unit 160 does not output the determination result obtained after the user started the walking movement until stable periodic signals are reliably obtained, judging that the determination result is less reliable, and decreases the influence of the variation of the sensor signals due to the changes in the walking movement.

Therefore, the determination unit 160 may set the predetermined time within the time during which it takes the user to take approximately 10 steps. It is desirable that the determination unit 160 sets the predetermined time within the time during which it takes the user to take approximately six steps.

Moreover, the determination unit 160 determines the second travel direction calculated by the second travel direction calculation unit 140 as the travel direction of the user after the predetermined period has elapsed since the state of the user changed from the non-walking state to the walking state (S370). Also, when the determination unit 160 judges that the walking state has been continuing (S350: No), the determination unit 160 determines the second travel direction calculated by the second travel direction calculation unit 140 as the travel direction of the user without waiting until the time has elapsed (S370).

In this way, when the user is in the walking state, the travel direction determination apparatus 100 uses the estimation result of the second travel direction calculation unit 140 on condition that a certain amount of time has elapsed, and thus the periodic signals according to the walking movement are stably obtained, and the estimation errors caused by using algorithm that relies on the walking state can be decreased. The travel direction determination apparatus 100 repeatedly executes the operational flow from the estimation of the travel direction (S320) to the selection of the travel direction (S380) until the process is ended.

The travel direction determination apparatus 100 ends the process responding to an input by the user to end the autonomous navigation. Also, the travel direction determination apparatus 100 may end the process responding to switchover to other travel direction estimation means or the like.

As described above, the travel direction determination apparatus 100 in the present embodiment can appropriately switch means to estimate the travel direction of the user according to the walking state of the user, and also decrease the estimation errors. Thereby, after the user started the walking movement from the state in which the user was still, even if the periodic signals that accompany the walking are unstable and even if the walking movement of the user itself is unstable, the estimation errors of the travel direction of the user can be decreased.

It has been described that the first travel direction calculation unit 130 of the travel direction determination apparatus 100 of the present embodiment described above calculates the rotation amounts about the gravity axis based on the sensor signals of the angular velocity sensors acquired by the sensor signal acquisition unit 110. Alternatively, the sensor signal acquisition unit 110 may acquire the sensor signals output from the geomagnetic sensors mounted in the mobile device 10, and the first travel direction calculation unit 130 may calculate the travel direction of the user based on the sensor signals.

The first travel direction calculation unit 130 can detect the direction in which the mobile device 10 is facing relative to the geomagnetism by the sensor signals of the geomagnetic sensors respectively corresponding to the xyz-axes of the mobile device 10, and can estimate the travel direction of the user according to temporal changes in the direction, for example. Also, the first travel direction calculation unit 130 may calculate the rotation amounts about the gravity axis from the temporal changes in each angle formed between each of the xyz-axes of the mobile device 10 and the geomagnetic direction.

Also, it has been described that the travel direction determination apparatus 100 of the present embodiment is provided with the walk detection unit 150 to detect the walking state of the user. Alternatively, the travel direction determination apparatus 100 may acquire the walking state of the user from external devices or the like. In this case, the travel direction determination apparatus 100 receives a detection result of the walking state of the user by a device provided inside or outside the mobile device 10, and determines the travel direction of the user according to the detection result.

As described above, the travel direction determination apparatus 100 of the present embodiment can precisely estimate the travel direction of the user, and thus the position of the user on the map can be accurately estimated even when it is applied to map matching.

Figure 5:
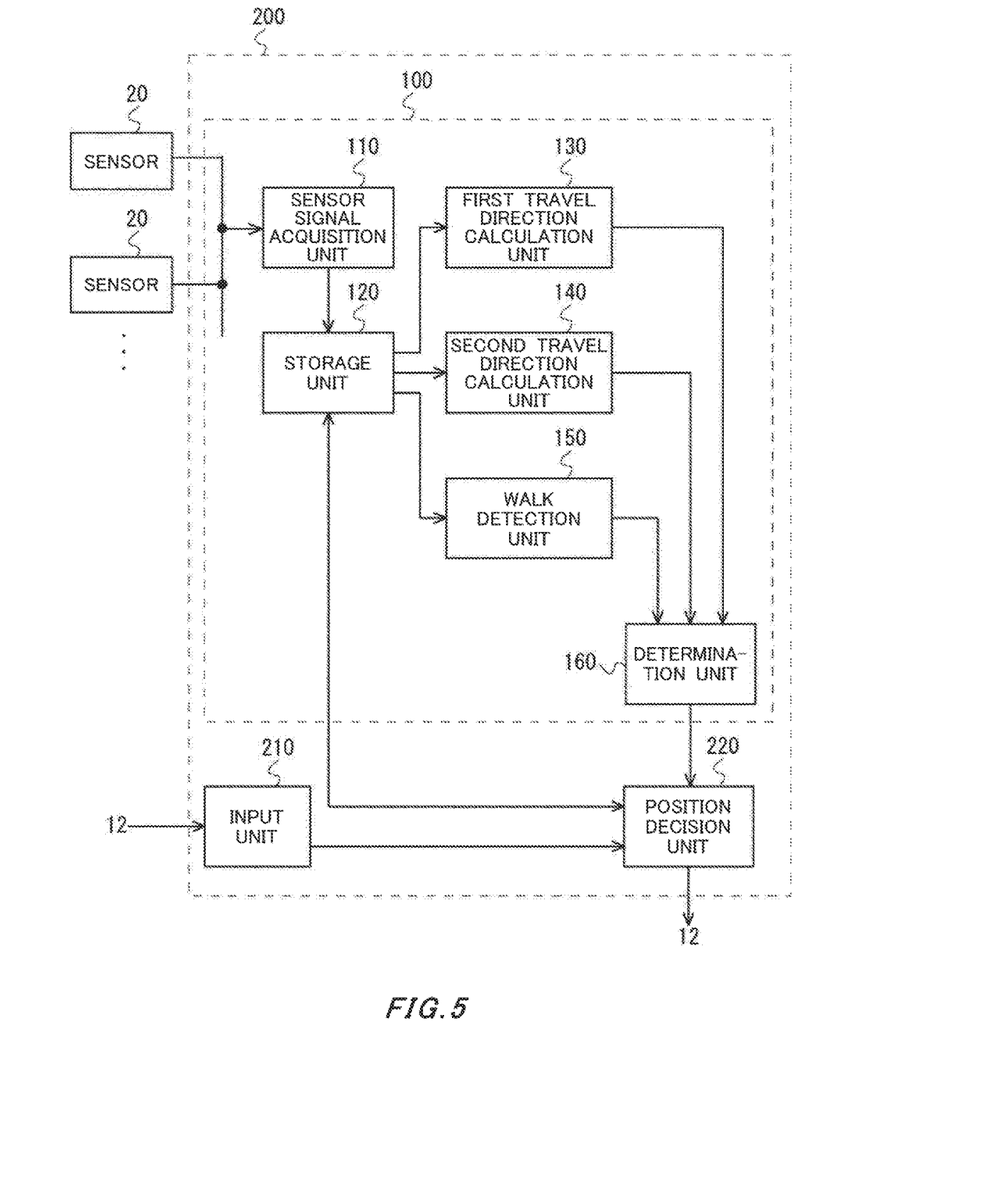
FIG. 5 shows an exemplary configuration of a map matching apparatus 200 according to the present embodiment.

FIG. 5 shows an exemplary configuration of a map matching apparatus 200 according to the present embodiment. In the map matching apparatus 200 of the present embodiment, operations substantially the same as those of the travel direction determination apparatus 100 according to the present embodiment shown in FIG. 2 are assigned with the same reference numerals, and descriptions thereof will be omitted. The map matching apparatus 200 is further provided with an input unit 210 and a position decision unit 220.

The input unit 210 inputs an initial position of the user. Also, the input unit 210 may input instructions to start the process of a map matching function. The map matching apparatus 200 may input the initial position of the user and input start of the map matching function by displaying map information on the display unit 12 of the mobile device 10 and causing the user to designate the current position, as an example. In this case, the input unit 210 may be an input device such as a touch panel combined with the display unit 12, as an example.

The storage unit 120 stores map information to be displayed on the display unit 12. Also, the storage unit 120 may store the initial position of the user input from the input unit 210.

The position decision unit 220 decides the position of the user on the map based on a movement amount from the initial position according to the travel direction information of the user which is output from the travel direction determination apparatus 100. The travel direction determination apparatus 100 can output, as the travel direction information, the travel direction of the user in which the errors are decreased. Therefore, the position decision unit 220 can precisely decide the position of the user on the map.

Here, when the walk detection unit 150 detects that the user is walking, the walk detection unit 150 counts the number of pulses of the periodic signals that accompany the walking, and also detects information of the number of steps taken by the user, as an example. In this case, the position decision unit 220 receives the information of the number of steps taken by the user through the determination unit 160 or by being connected to the walk detection unit 150. Moreover, the position decision unit 220 can calculate the movement amount (the number of steps×stride) of the user using information of the stride of the user. Here, the storage unit 120 may store the information of the stride of the user in advance.

The position decision unit 220 displays the decided position of the user on the display unit 12 together with the map information. Thereby, the user can check the position of the user itself on the map regardless of the walking state.

Figure 6:
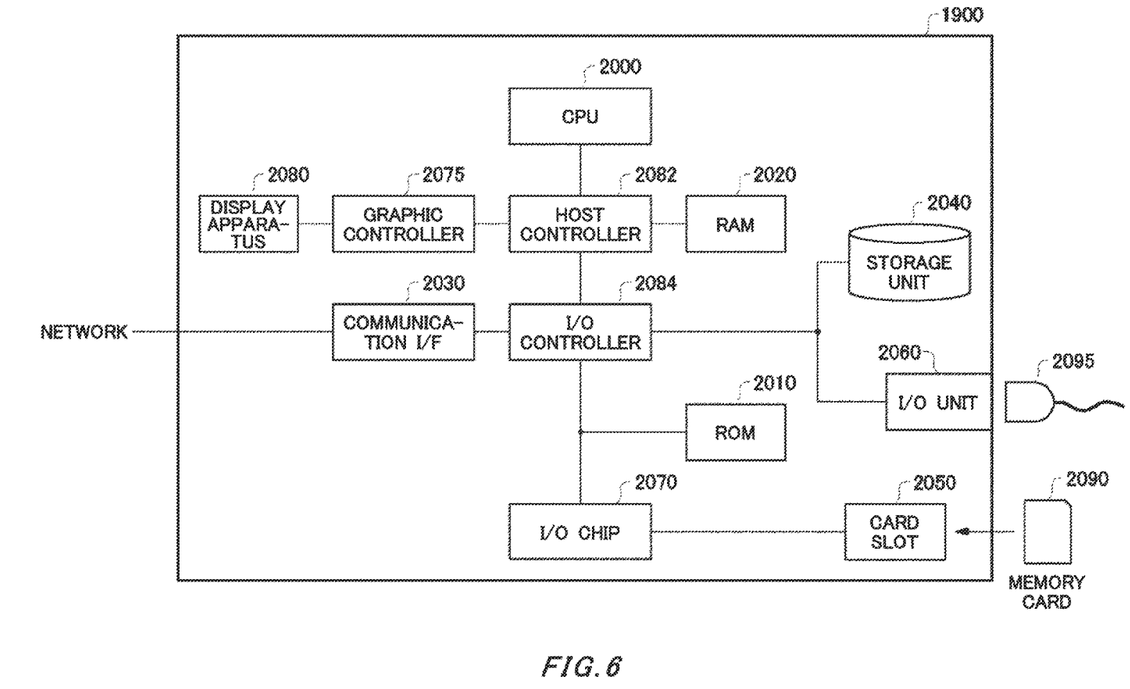
FIG. 6 shows an example of a hardware configuration of a computer 1900 functioning as the travel direction determination apparatus 100 according to the present embodiment.

FIG. 6 shows an example of a hardware configuration of a computer 1900 functioning as the travel direction determination apparatus 100 according to the present embodiment. The computer 1900 according to the present embodiment is mounted inside the mobile device 10, for example. Alternatively, the computer 1900 may be provided outside the mobile device 10, and may receive a sensor output from the mobile device 10 and transmit a decision result of an anchor position or the like to the mobile device 10. In this case, the computer 1900 performs transmission/reception wirelessly with the mobile device 10, as an example.

The computer 1900 according to the present embodiment is provided with a CPU peripheral portion including a CPU 2000, a RAM 2020, a graphic controller 2075, and a display apparatus 2080, all of which are connected to each other by a host controller 2082; a communication interface 2030, a storage unit 2040, and an input/output unit 2060, all of which are connected to the host controller 2082 by an input/output controller 2084; a ROM 2010; a card slot 2050; and an input/output chip 2070.

The host controller 2082 connects the RAM 2020 with the CPU 2000 and the graphic controller 2075 accessing the RAM 2020 at a high transfer rate. The CPU 2000 operates based on programs stored in the ROM 2010 and the RAM 2020, and controls each unit. The graphic controller 2075 acquires image data generated by the CPU 2000 or the like on a frame buffer provided inside the RAM 2020 and displays the image data in the display apparatus 2080. Alternatively, the graphic controller 2075 may internally include the frame buffer storing the image data generated by the CPU 2000 or the like.

The input/output controller 2084 connects the communication interface 2030 serving as a relatively high velocity input/output apparatus, and the storage unit 2040, and the input/output unit 2060 to the host controller 2082. The communication interface 2030 communicates with other apparatuses via a network. The storage unit 2040 stores the programs and data used by the CPU 2000 housed in the computer 1900. The storage unit 2040 is a non-volatile memory and is a flash memory or hard disk, or the like, for example.

The input/output unit 2060 is connected to a connector 2095, and transmits and receives programs or data to and from the outside and provides the programs or data to the storage unit 2040 via the RAM 2020. The input/output unit 2060 may perform transmission/reception with the outside using a standardized connector and communication method, and in this case, the input/output unit 2060 may use standards such as USB, IEEE 1394, HDMI (Registered Trademark), or Thunderbolt (Registered Trademark). Also, the input/output unit 2060 may perform transmission/reception with the outside using a wireless communication standard such as Bluetooth (Registered Trademark).

Also, the input/output controller 2084 is connected to the ROM 2010, and is also connected to the card slot 2050 and the input/output chip 2070 serving as a relatively low velocity input/output apparatus. The ROM 2010 stores a boot program performed when the computer 1900 starts up, and/or a program relying on the hardware of the computer 1900, and the like. The card slot 2050 reads programs or data from a memory card 2090 and provides the read information to the storage unit 2040 via the RAM 2020. The input/output chip 2070 may connect the card slot 2050 to the input/output controller 2084 along with various types of the input/output apparatuses via a parallel port, a serial port, a keyboard port, a mouse port, or the like, for example.

The programs provided to the storage unit 2040 via the RAM 2020 are provided by a user through the input/output unit 2060 or by being stored in a recording medium such as the memory card 2090. The programs are read from the recording medium, installed in the storage unit 2040 inside the computer 1900 via the RAM 2020, and executed in the CPU 2000.

The programs are installed in the computer 1900, and cause the computer 1900 to function as the sensor signal acquisition unit 110, the storage unit 120, the first travel direction calculation unit 130, the second travel direction calculation unit 140, the walk detection unit 150, and the determination unit 160, and the like.

The information processes recorded in the programs are read by the computer 1900 to cause the computer 1900 to function as the sensor signal acquisition unit 110, the storage unit 120, the first travel direction calculation unit 130, the second travel direction calculation unit 140, the walk detection unit 150, and the determination unit 160, and the like, which are concrete means in which software and various types of the hardware resources described above cooperate. Moreover, by the concrete means, a unique travel direction determination apparatus 100 complying with an intended use is configured by realizing the calculation or processing of the information appropriate for the intended use of the computer 1900 of the present embodiment.

As an example, when communication is performed between the computer 1900 and an external apparatus or the like, the CPU 2000 performs the communication program loaded in the RAM 2020, and provides the communication interface 2030 with communication processing instructions based on the content of the process recorded in the communication program. The communication interface 2030 is controlled by the CPU 2000 to read the transmission data stored in the RAM 2020, the storage unit 2040, the memory card 2090, or a transmission buffer region or the like provided in a storage apparatus connected via the input/output unit 2060 and to transmit this transmission data to the network, or to write reception data received from the network onto a reception buffer region or the like on the storage apparatus. In this way, the communication interface 2030 may transfer transmission/reception data to the storage apparatus through DMA (Direct Memory Access) scheme, and alternatively, the CPU 2000 may transfer the transmission/reception data by reading the data from the storage apparatus or communication interface 2030 that are the origins of transfer, and writing the data onto the communication interface 2030 or the storage apparatus that are the destinations of transfer.

Also, the CPU 2000 performs various type of processes on the data in the RAM 2020 by reading into the RAM 2020, through DMA transfer or the like of all or a necessary portion such as the database or files stored in the storage unit 2040, the memory card 2090, or the storage apparatus connected via the input/output unit 2060, or the like. Moreover, the CPU 2000 writes the processed data back to the storage apparatus through DMA transfer, or the like. In such a process, the RAM 2020 is considered to be a unit that temporarily holds the content of the storage apparatus, and therefore the RAM 2020, and the storage apparatus, and the like in the present embodiment are referred to as a memory, a storage unit, or a storage apparatus, or the like. Various pieces of information in the present embodiment, such as various types of programs, data, tables, databases, or the like are stored on the storage apparatus to become the target of the information processing. In addition, the CPU 2000 can hold a portion of the RAM 2020 in a cache memory and read from or write to the cache memory. In such a configuration as well, the cache memory serves a part of the function of the RAM 2020, and therefore the cache memory is also included with the RAM 2020, the memory, and/or the storage apparatus in the present embodiment, except when it is shown with distinction.

Also, the CPU 2000 executes various types of processes including various types of the calculations, information processing, condition judgment, searching for/replacing information, or the like set forth in the present embodiment for the data read from the RAM 2020, as designated by the command sequence of the program, and writes the result back onto the RAM 2020. For example, when performing condition judgment, the CPU 2000 judges whether various types of variables shown in the present embodiment fulfills a condition of being greater than, less than, no less than, no greater than, equal, or the like, compared to another variable or constant. If the condition is fulfilled (or unfulfilled), the CPU 2000 branches into a different command sequence, or invokes a subroutine.

Also, the CPU 2000 can search for information stored in a file in the storage apparatus or the database, or the like. For example, if a plurality of entries respectively corresponding to a first type of attribute value and a second type of attribute value are stored in the storage apparatus, the CPU 2000 can search for entries matching a condition designated by the first type of attribute value from among the plurality of entries stored in the storage apparatus. The CPU 2000 can then obtain the second type of attribute value corresponding to the first type of attribute value fulfilling the predetermined condition by reading the second type of attribute value stored at the same entry.

The programs or modules shown above may also be stored in an external recording medium. An optical recording medium such as a DVD, Blu-ray (Registered Trademark), or CD, a magneto-optical recording medium such as MO, a tape medium, a semiconductor memory such as an IC card, can be used as the recording medium, other than the memory card 2090. Also, a storage apparatus such as a hard disk or RAM that is provided with a server system connected to the Internet or a specialized communication network may be used as the recording medium to provide the programs to the computer 1900 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A travel direction determination apparatus, comprising:
   a sensor signal acquisition unit that acquires sensor signals of sensors mounted in a mobile device;
   a first travel direction calculation unit that calculates a travel direction of a user without relying on a walking state of the user;
   a second travel direction calculation unit that calculates the travel direction of the user based on the sensor signals when the user who holds the mobile device is in a walking state;
   a walk detection unit that detects whether or not the user is in the walking state based on a distribution value of a synthesis acceleration of a plurality of accelerometers mounted in the mobile device, counts the number of pulses of periodic signals that accompany the walking state; and detects information of the number of steps taken by the user; and
   a determination unit that first determines the travel direction of the user from an output calculated by the first travel direction calculation unit as the travel direction of the user until it is detected that the user took a predetermined number of steps since the state of the user has changed from the non-walking state to the walking state, and then determines the travel direction of the user from an output calculated by the second travel direction calculation unit after the predetermined number of steps was detected as the travel direction of the user, responding to changes in the state of the user from non-walking state to walking state.

2. The travel direction determination apparatus according to claim 1, wherein the determination unit determines the travel direction calculated by the first travel direction calculation unit as the travel direction of the user when the state of the user is the non-walking state.

3. The travel direction determination apparatus according to claim 1, wherein the determination unit determines the travel direction calculated by the first travel direction calculation unit as the travel direction of the user during a predetermined period after the state of the user has changed from the non-walking state to the walking state, and determines the travel direction calculated by the second travel direction calculation unit as the travel direction of the user after the predetermined period has elapsed.

4. The travel direction determination apparatus according to claim 1, wherein the first travel direction calculation unit calculates the travel direction of the user responding to changes in the orientation of the mobile device based on the sensor signals.

5. The travel direction determination apparatus according to claim 4, wherein the first travel direction calculation unit calculates from the sensor signals rotation angles about a gravity axis of the mobile device, and calculates the travel direction of the user from a cumulative value of the calculation results of rotation angle.

6. The travel direction determination apparatus according to claim 5, wherein the first travel direction calculation unit calculates the rotation angle about the gravity axis of the mobile device based on the sensor signals of the sensors that detect the rotation angles of two or more axial directions of the mobile device.

7. The travel direction determination apparatus according to claim 6, wherein the first travel direction calculation unit selects the two sensor signals having the largest and the second largest absolute values of signal component about the gravity axis out of the sensor signals of the sensors that detect the rotation angles of three axial directions of the mobile device, and calculates the rotation angle about the gravity axis of the mobile device based on the selected two sensor signals.

8. The travel direction determination apparatus according to claim 1, wherein the sensor signal acquisition unit acquires sensor signals of at least either one of angular velocity sensor and accelerometer mounted in the mobile device.

9. The travel direction determination apparatus according to claim 4, wherein the sensor signal acquisition unit acquires sensor signals output from geomagnetic sensor mounted in the mobile device, and the first travel direction calculation unit calculates the travel direction of the user based on the sensor signals.

10. A travel direction determination method, comprising:
    acquiring sensor signals of sensors mounted in a mobile device;
    calculating, by a first travel direction calculation unit, a travel direction of a user without relying on a walking state of the user;
    calculating, by a second travel direction calculation unit, the travel direction of the user based on the sensor signals when the user who holds the mobile device is in a walking state;
    detecting whether or not the user is in the walking state based on a distribution value of a synthesis acceleration of a plurality of accelerometers mounted in the mobile device;
    counting the number of pulses of periodic signals that accompany the walking state;
    detecting information of the number of steps taken by the user;
    first determining the travel direction of the user from an output calculated by the first travel direction calculation unit as the travel direction of the user until it is detected that the user took a predetermined number of steps since the state of the user has changed from the non-walking state to the walking state, and then determining the travel direction of the user from an output calculated by the second travel direction calculation unit after the predetermined number of steps was detected as the travel direction of the user, responding to changes in the state of the user from non-walking state to walking state.

11. A map matching apparatus comprising:
    the travel direction determination apparatus according to claim 1;
    a storage unit that stores an initial position of the user and map information; and
    a position decision unit that decides a position of the user on a map based on a movement amount from the initial position according to travel direction information of the user which is output from the travel direction output apparatus.

12. A computer readable medium storing therein programs that, when executed by a computer, causes the computer to function as the travel direction determination apparatus according to claim 1.

13. The travel direction determination apparatus according to claim 1, wherein the determination unit first determines the travel direction calculated by the first travel direction calculation unit as the travel direction of the user, and then determines the travel direction calculated by the second travel direction calculation unit as the travel direction of the user, responding to a U-turn made by the user.

* * * * *